W. E. PETTY.
DRIER.
APPLICATION FILED JULY 12, 1918.

1,297,727.

Patented Mar. 18, 1919.
2 SHEETS—SHEET 1.

Inventor
W. E. Petty.

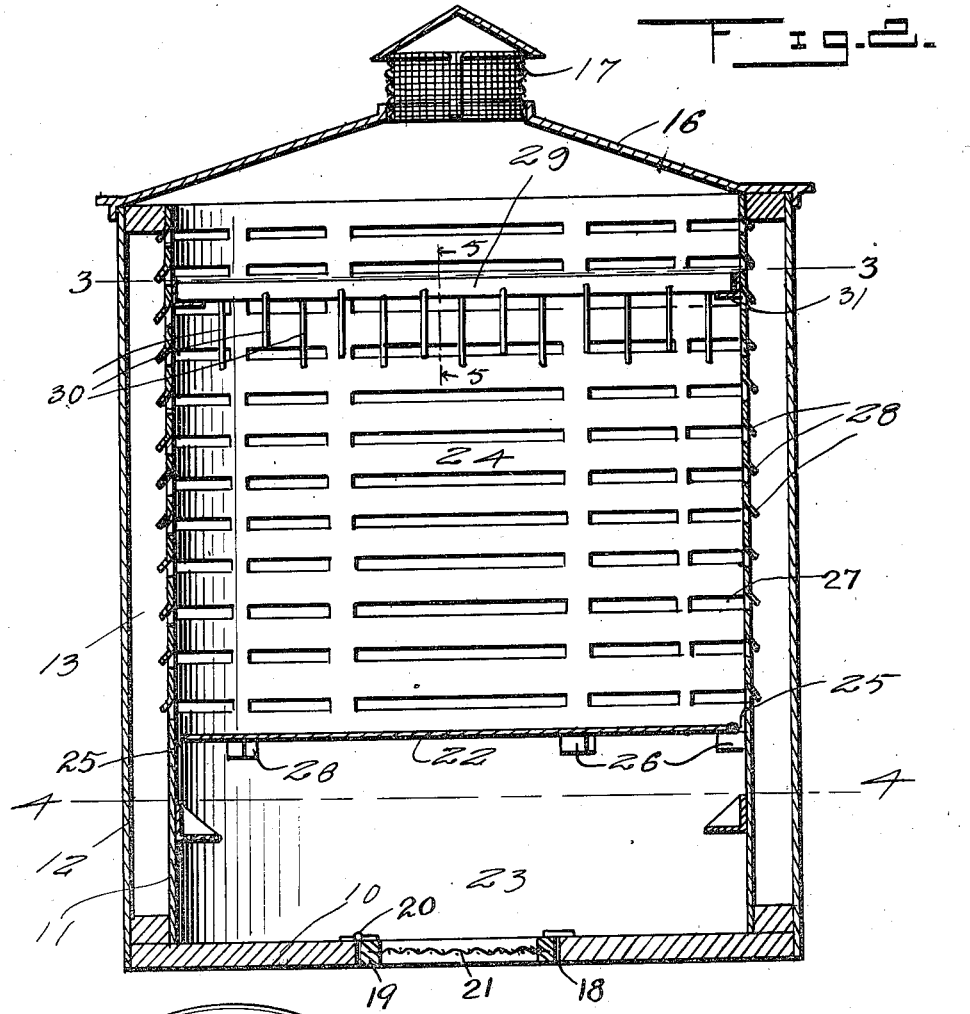
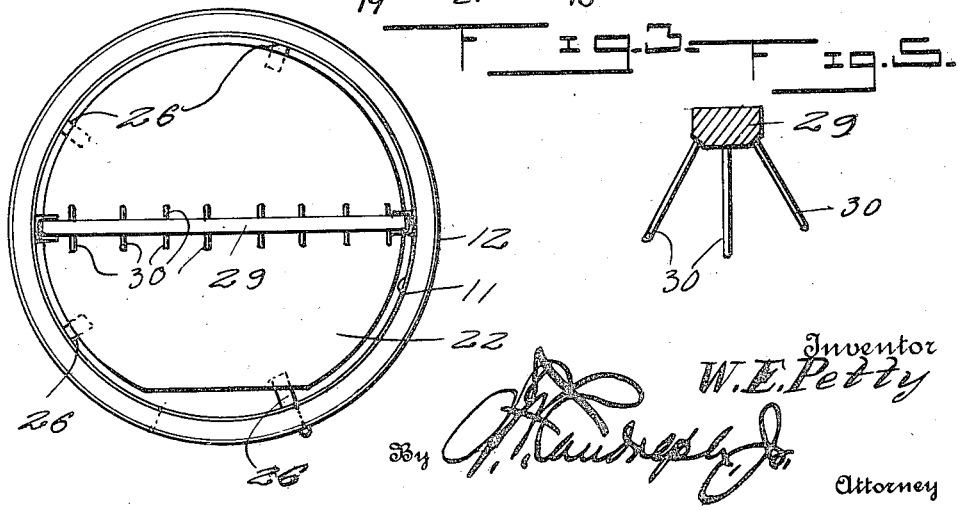
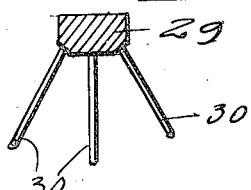

UNITED STATES PATENT OFFICE.

WILLIAM E. PETTY, OF STORM LAKE, IOWA.

DRIER.

1,297,727. Specification of Letters Patent. Patented Mar. 18, 1919.

Application filed July 12, 1918. Serial No. 244,593.

*To all whom it may concern:*

Be it known that I, WILLIAM E. PETTY, a citizen of the United States, residing at Storm Lake, in the county of Buena Vista and State of Iowa, have invented certain new and useful Improvements in Driers, and I do hereby declare the following to be a full, clear, and exact description of the invention, such as will enable others skilled in the art to which it appertains to make and use the same.

The object of the invention is to provide a drier designed especially for use in preparing seed corn for winter storage and if desired for storing the same until required for planting purposes, but also adapted for use in drying or storing other products, or as a smoke house, as for example in the curing of tobacco, meats and the like, and with these objects in view, the invention consists in a construction, combination and relation of parts of which a preferred embodiment is shown in the drawing, it being understood, however, that changes in form, size, proportions and details may be resorted to within the scope of the appended claims without departing from the spirit or principle of invention involved.

In the drawings:

Fig. 2 is a vertical central sectional view of the same,

Figure 1:
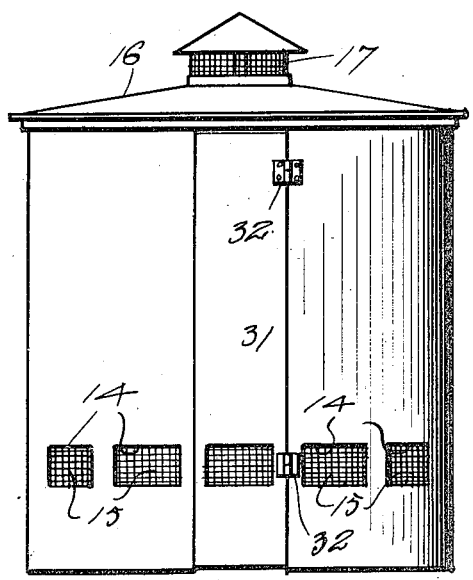
Figure 1 is a side view of a device embodying the invention.
Figure 4:
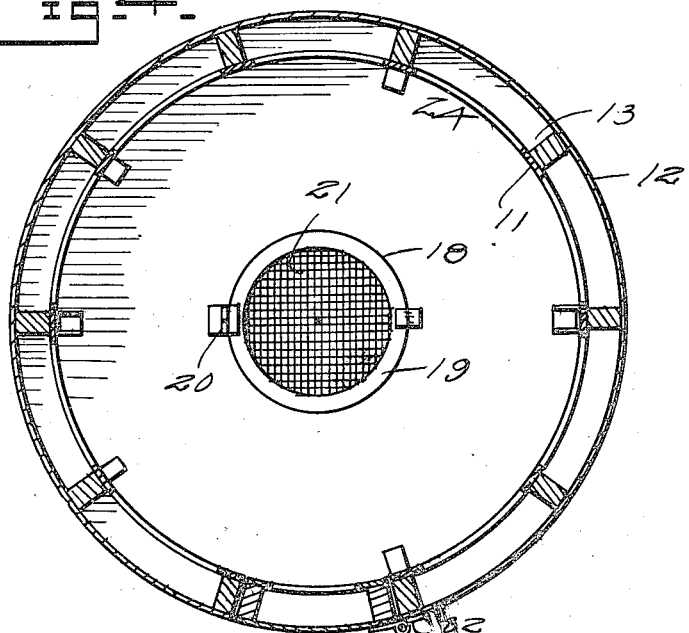

Fig. 3 is a horizontal section on the plane indicated by the line 3—3 of Fig. 2, Fig. 4 is a horizontal section on the plane indicated by the line 4—4 of Fig. 2, Fig. 5 is a detail section on the plane indicated by the line 5—5 of Fig. 2 to show one of the supporting racks which may be used in this connection.

From a suitable base or floor 10 rise the side walls consisting of inner and outer shells or elements 11 and 12, spaced apart to form an intermediate flue 13, with which communicate inlet openings 14 in the exterior shell to permit of the free circulation of air, said openings being screened, as shown at 15. A domed or conical cover or roof 16 is provided with a central screened ventilator 17, and in the floor or bottom of the receptacle is provided an opening 18 fitted with a movable door 19, which may be hinged, as shown at 20, and is fitted with a screen 21, also designed for the admission of air. Interiorly the receptacle is divided by a transverse horizontal partition 22 to form a lower heating compartment 23, within which a lamp, stove or any suitable or convenient heating apparatus may be arranged, and a storage compartment 24, said partition terminating peripherally short of the inner surface of the inner shell to form circulating passages 25 and being removably supported by suitable brackets 26. Also in order to establish communication between the circulating flues 13 and the storage compartment the inner shell 11 is provided with elongated openings or slots 27, covered by shields or deflectors 28, which may be formed by stamping, or in any other convenient and economical manner. These shields serve to deflect the air rising in a column through the flue into the interior of the storage compartment for contact with the seed corn or other material stored therein, the necessary upward current or circulation of air being induced by the heating device which also warms the air and thus increases the rapidity of the drying operation by extracting the moisture in the form of vapor from the corn or other material and carrying it out through the ventilator in the top or roof.

The material to be dried may be supported in any convenient manner within the storage compartment, and when seed corn is the material to be dried, racks may be employed, one form of rack being indicated in the drawings at 29, and having arms or fingers 30, the terminals of said racks being supported in brackets 31 projecting inwardly from the surface of the inner shell 11. Obviously any desired number of these or of any other type of rack may be employed to suit the preference of the operator or the character of the products to be dried, and by reason of the fact that the air is admitted to the flue from all sides and is communicated to the interior of the storage compartments from all directions, the outlet being at the center of the top while the hot air from the heating apparatus rises around the periphery of the deflector plate 22, a uniform drying of the contents of the storage compartment is assured, and by the same means a fumigating gas, such as of sulphur, may be applied to the contents of the storage compartment, as of seed corn just prior to planting the same so as to minimize the risk of cutworms and similar destructive agencies after the corn has been planted.

In order to give ready access to the interior of the receptacle a section 31' of the side wall thereof may be mounted upon hinges 32 to form a door, thus facilitating the introduction and removal of material to be dried or stored, and which when contained in the receptacle is protected against insects or mice and other vermin by means of the screens with which the several ventilating openings are provided.

Having described the invention, I claim:

1. A drier provided with walls consisting of inner and outer shells forming an intervening flue, a central top ventilator, the interior being divided by a horizontal deflector to form an upper storage compartment and a lower heating compartment in communication at the periphery of said deflector, and said flue being provided in its outer wall near the bottom with screened air inlet openings and in its inner wall being in communication with said storage compartment with openings for circulation of air induced by the upward draft from the heating compartment.

2. A drier having its side walls consisting of separated inner and outer shells forming an intermediate air flue provided at its lower end with screened inlet openings, said drier also being provided in its bottom with a central screened inlet opening and at the center of its top with a ventilator, a horizontal deflector plate being disposed interiorly of the drier to form an upper storage compartment and a lower heating compartment in communication by a peripheral separation of said deflector plate from the inner surface of the inner shell, and said inner shell above the deflector plate being provided with openings or slots establishing communication between said compartment and the flue.

3. The herein described drier having a base or floor provided with a central screened door, a wall consisting of inner and outer spaced shells of which the latter is provided near its bottom with screened air inlet openings, a top having a central ventilator, a horizontal deflector plate dividing the interior into an upper storage compartment and a lower heating compartment, said plate being peripherally spaced from the inner shell to form an air circulating passage and a portion of the wall being hingedly mounted to form an entrance door, and supporting racks removably mounted in the storage compartment, the inner shell above the deflector plate being provided with horizontally disposed slots establishing communication between said compartment and the flue and being covered by inclined exterior shields or deflectors.

In testimony whereof I affix my signature in presence of two witnesses.

WILLIAM E. PETTY.

Witnesses:
GEO. J. SCHAELER,
R. A. JONES.